L. J. HAMILTON.
ATTACHMENT FOR FURROW WHEELS.
APPLICATION FILED MAY 25, 1908.

928,446.

Patented July 20, 1909.
2 SHEETS—SHEET 1.

Witnesses
Chas. C. Richardson,
M. T. Miller

Inventor
Leonard J. Hamilton.
By Chandler & Chandler
Attorney

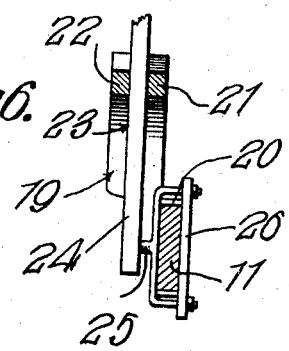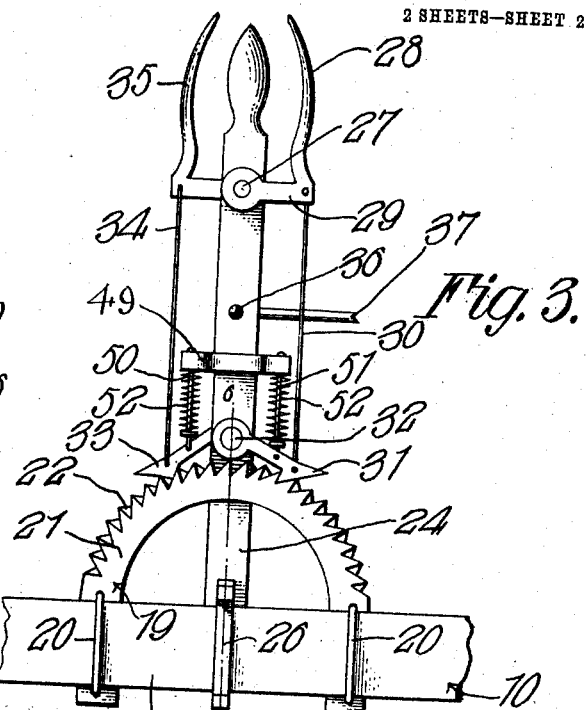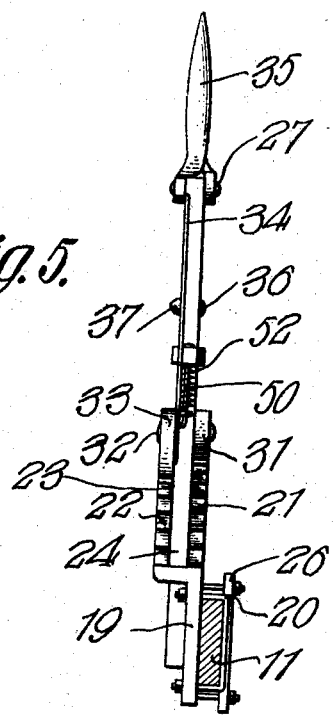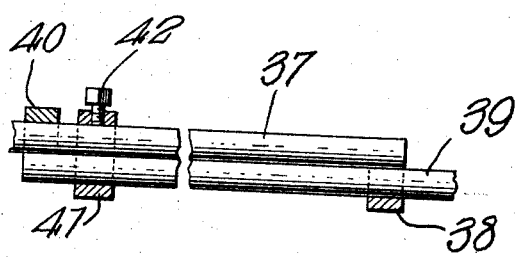

UNITED STATES PATENT OFFICE.

LEONARD J. HAMILTON, OF GUYMON, OKLAHOMA.

ATTACHMENT FOR FURROW-WHEELS.

No. 928,446.          Specification of Letters Patent.          Patented July 20, 1909.

Application filed May 25, 1908. Serial No. 434,856.

*To all whom it may concern:*

Be it known that I, LEONARD J. HAMILTON, a citizen of the United States, residing at Guymon, in the county of Texas, State of Oklahoma, have invented certain new and useful Improvements in Attachments for Furrow-Wheels; and I do hereby declare the following to be a full, clear, and exact description of the invention, such as will enable others skilled in the art to which it appertains to make and use the same.

The invention relates to an attachment for furrow wheels and is particularly adapted for use on a gang or sulky plow for adjusting the furrow wheels thereof.

The primary object of the invention is the provision of an adjusting means for attachment to the frame of a gang or sulky plow and having connection with the furrow wheels thereof whereby the latter may be adjusted to effect the proper line of draft of the said plow when in operation and furthermore does away with the requirement of a guide beam or tongue for controlling the furrow wheels which is the ordinary construction now in use.

Another object of the invention is the provision of an attachment for a gang or sulky plow and which includes a throw lever for adjusting the furrow wheels of the plow and which lever is controlled by locking means whereby the furrow wheels may be held in various adjusted positions.

In the accompanying drawings and forming part of this specification is illustrated a form of embodiment of the invention which to enable those skilled in the art to practice the same will be set forth at length in the following description while the novelty of the invention will be included in the claim succeeding said description.

Figure 1:
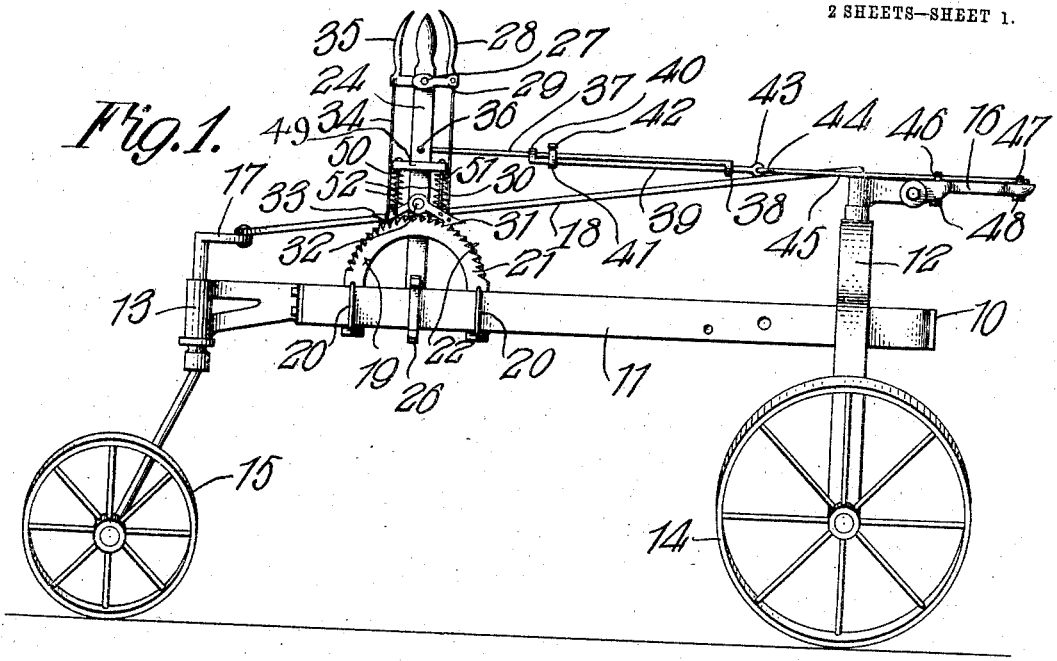
Figure 2:
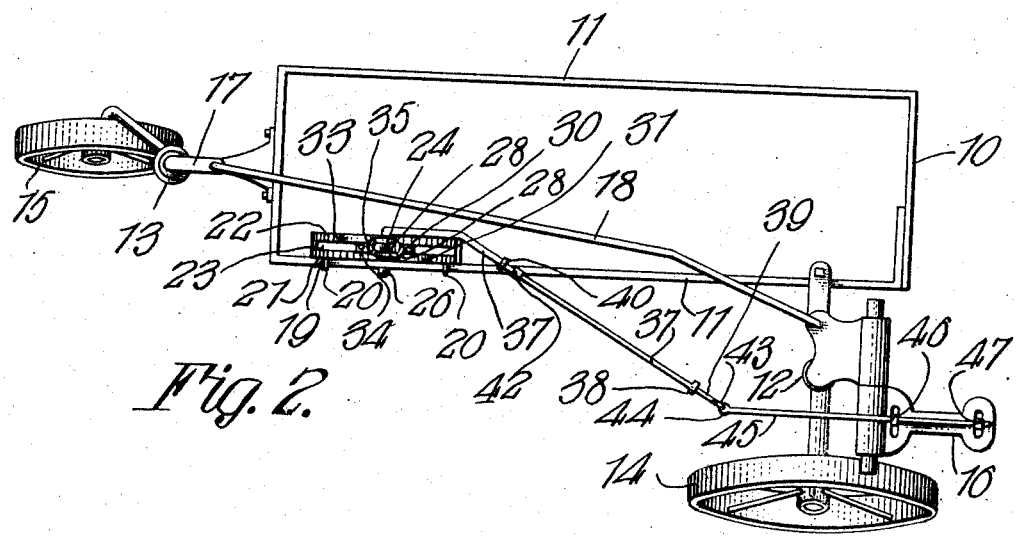

In the drawings:—Figure 1 is a side view of a gang plow frame having the invention applied thereto. Fig. 2 is a top plan view thereof. Fig. 3 is a fragmentary view of the gang plow frame showing the segment in side elevation and the throw lever with its coöperative parts. Fig. 4 is a detail view of the connecting rods with their locking member, partly broken away. Fig. 5 is an end view of the structure shown in Fig. 3.

Similar reference characters indicate corresponding parts throughout the several views in the drawings.

In the drawings, and to enable the invention to be carried into practice there is shown a gang plow of the usual type which includes a frame 10 having its side bars 11 and to which frame is swiveled standards 12 and 13 forming the stems of the usual front and rear furrow wheels 14 and 15 respectively. Upon the standard 12 is mounted the clevis 16 for the attachment of the usual form of draft beam; however said beam in this instance is dispensed with to accommodate the attachment that will be hereinafter more fully described. To the rear standard 13 is secured an angle arm 17 which latter is pivotally connected to a connecting rod 18, the opposite extremity of which has connection with a clevis 16 whereby the front and rear furrow wheels 14 and 15 can be moved in unison.

Upon one of the side bars 11 of the gang plow frame 10 is mounted a segment 19 which is connected thereto by clips 20 and which segment includes arcuate shaped spaced coextensive toothed-racks or sections 21 and 22 which latter has an intermediate space 23 between the same and through which passes and is adapted for swinging movement a throw lever 24, the lower end of which is pivotally connected to a stud 25 of a clip 26 adapted for adjustable connection with the side bar 11 of the gang plow frame.

On one side of the throw lever 24 near the upper extremity thereof is an outwardly projecting stud 27 upon which is pivotally mounted a hand-releasing lever 28 having a right angular extension 29 to which one end of a pull rod 30 is connected and which latter has its opposite end connected to a locking pawl or dog 31 pivoted as at 32 to the throw lever 24 and which dog or pawl 31 engages the toothed section 21 to prevent said throw lever from being swung forward on its pivot in the segment 19, however said pawl or dog 31 is adapted to ride over the toothed section 21 when the throw lever is free to move or swing in the opposite direction. Upon the pivot 32 at the opposite side of the lever 24 is a locking pawl or dog 33 which latter engages the toothed section 22 and when in this engagement locks the throw lever 24 against movement rearwardly in the segment 19; however, said locking pawl or dog 33 is adapted to ride over the toothed section 22 when the lever is free to move forwardly in the segment 19 upon the disengagement of the locking pawl or dog 31 from the other toothed section. To the said locking pawl or dog 33 is connected one end of the pull lever 34, the opposite end of which is connected to a hand releasing lever 35 which is connected to the stud 27 of the throw lever.

To the throw lever 24 is attached as at 36 a connecting rod 37 having at its opposite end a depending eye 38 through which slides an adjustable connecting rod 39 one end of which is provided with a collar or sleeve 40 surrounding said connecting rod 37 and slidable thereon. On the connecting rod 37 is a binding collar 41 through which passes the adjustable connecting rod 39 and is locked thereto by a set screw 42.

Formed on the free end of the adjustable connecting rod 39 is an eye 43 having connection with an eye 44 on the end of a link rod 45 which latter has its opposite end secured to the clevis 16 by binding collars 46 and 47 which latter are secured to the said link rod 45 at opposite sides of the clevis by set screws 48. Above the locking pawls or dogs 31 and 33 respectively and upon the throw lever 34 is an extension 49 and through which slide pins 50 and 51 pivotally connected to the said locking pawls or dogs 31 and 33 respectively and surrounding each of the said pins is a coiled tension spring 52 having one end bearing against the connecting bar 49 and the opposite end against the pawl or dog whereby each of the pawls or dogs are normally held in locking engagement with the toothed sections.

What is claimed is—

In an attachment of the class described, the combination with a gang plow frame, of standards swiveled in said frame at opposite ends thereof, furrow wheels carried by the standards, a segment, clips adjustably connecting the segment to the plow frame, spaced rows of teeth formed on said segment, a pivot clip adjustably connected to the plow frame, a throw lever connected for movement to said pivot clip and working between the rows of teeth, locking pawls mounted upon said throw lever and normally engaging the teeth, manually operable means for operating said pawls, a rod connection between said standards, and connections between one of said standards and the throw lever.

In testimony whereof, I affix my signature, in presence of two witnesses.

LEONARD J. HAMILTON.

Witnesses:
F. HINER DALE,
BEATRIX FINCH.